United States Patent
Yoon et al.

(10) Patent No.: US 11,365,804 B2
(45) Date of Patent: Jun. 21, 2022

(54) CONTROL METHOD FOR ACCELERATION OF CVT

(71) Applicants: Hyundai Motor Company, Seoul (KR); Kia Motors Corporation, Seoul (KR)

(72) Inventors: Sungjoon Yoon, Gwacheon-si (KR); Ho Young Kim, Suwon-si (KR); Kyung Eup Kim, Suwon-si (KR); Youngmin Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 93 days.

(21) Appl. No.: 17/068,174

(22) Filed: Oct. 12, 2020

(65) Prior Publication Data

US 2021/0293333 A1 Sep. 23, 2021

(30) Foreign Application Priority Data

Mar. 20, 2020 (KR) .................. 10-2020-0034407

(51) Int. Cl.
*F16H 61/662* (2006.01)
*F16H 9/14* (2006.01)
*F16H 61/00* (2006.01)

(52) U.S. Cl.
CPC ......... *F16H 61/66236* (2013.01); *F16H 9/14* (2013.01); *F16H 61/66272* (2013.01); *F16H 2061/0075* (2013.01)

(58) Field of Classification Search
CPC ............... F16H 9/14; F16H 2061/0075; F16H 2061/6611; F16H 61/66236; F16H 61/66272
See application file for complete search history.

(56) References Cited

U.S. PATENT DOCUMENTS

| 4,547,178 | A | * | 10/1985 | Hayakawa | ........ F16H 61/66263 477/45 |
| 10,641,384 | B2 | * | 5/2020 | Kishi | .................. F16H 61/0213 |
| 2004/0185974 | A1 | * | 9/2004 | Labbe | ............... F16H 61/66272 474/19 |
| 2015/0345630 | A1 | * | 12/2015 | Wang | ................ F16H 61/66236 474/11 |

* cited by examiner

*Primary Examiner* — Edwin A Young
(74) *Attorney, Agent, or Firm* — Morgan, Lewis & Bockius LLP

(57) ABSTRACT

A CVT acceleration control method applied to a CVT-mounted vehicle including an accelerator position sensor, a vehicle speed sensor, a driving pulley rotation sensor and a driven pulley rotation sensor that is configured to detect a rotation speed of a driven pulley and to output a corresponding signal, a CVT operation portion and a controller, the CVT acceleration control method, may include determining, by the controller, whether a current vehicle driving state satisfies a predetermined starting control condition, monitoring, by the controller, a current driving pulley rotation speed change, determining, by the controller, whether the current vehicle driving state satisfies a predetermined trigger condition, setting, by the controller, a target driving pulley rotation speed change, and controlling, by the controller, the operation of the CVT operation portion such that the current driving pulley rotation speed change converges to the target driving pulley rotation speed change.

19 Claims, 10 Drawing Sheets

CONTROL METHOD FOR ACCELERATION OF CVT

CROSS-REFERENCE TO RELATED APPLICATION

The present application claims priority to Korean Patent Application No. 10-2020-0034407 filed on Mar. 20, 2020, the entire contents of which is incorporated herein for all purposes by this reference.

BACKGROUND OF THE INVENTION

Field of the Invention

The present invention relates to a continuously variable transmission (CVT) acceleration control method. More particularly, the present invention relates to a CVT acceleration control method that provides a dynamic driving characteristic to a CVT-mounted vehicle and provides smooth acceleration in a start region.

Description of Related Art

CVT has a merit capable of freely controlling a transmission ratio, thereby promoting an enhancement of fuel efficiency and providing a dynamic driving characteristic to a driver.

A vehicle with a general CVT mounted can perform AT (automatic transmission) simulation control when the vehicle starts (accelerates) after stopping. However, when entering the AT simulation control, non-linear acceleration occurs due to a sudden change in pulley ratio.

FIG. 9 is a graph showing AT simulation control of a general CVT-mounted vehicle, and FIG. 10 is a graph showing the acceleration change of a general CVT-mounted vehicle.

Referring to FIG. 9 and FIG. 10, AT simulation control section may be divided into a kick-down (hereinafter referred as KD) section and a linear section. During transitioning from the KD section to the linear section, the target Np (target drive pulley rotation speed) changes rapidly, and to follow it, the pulley ratio changes rapidly, resulting in a non-linearity of acceleration.

That is, when the driver steps on the accelerator pedal to start the vehicle (accelerate at stop or at low speed) and the accelerator position signal (APS) is generated, the target Np (Np_target) is determined according to the accelerator pedal position, and the rotation speed of the driving pulley (current Np) is following or convergence according to the target Np (Np_target).

However, when transitioning from the KD section to the linear section, the target Np (drive pulley rotation speed) changes rapidly, and this causes the current driving pulley's rotation speed (current Np) to increase from the target Np and then follow the target Np again. That is, as shown in FIG. 9 and FIG. 10, there is a section in which the acceleration change of the vehicle becomes rapid.

In FIG. 10, Np_end means the driving pulley rotation speed at which the linear section end portions.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a CVT acceleration control method that provides a smooth acceleration in start region while providing a dynamic driving characteristic.

A CVT acceleration control method various exemplary embodiments of the present invention may be applied to a CVT-mounted vehicle including an accelerator position sensor that is configured to detect an accelerator operation angle and to output a corresponding signal, a vehicle speed sensor that is configured to detect a vehicle speed of a vehicle and to output a corresponding signal, a driving pulley rotation sensor that is configured to detect a rotation speed of a driving pulley and to output a corresponding signal, a driven pulley rotation sensor that is configured to detect a rotation speed of a driven pulley and to output a corresponding signal, a CVT operation portion that is configured to control a pulley ratio of the driving pulley and the driven pulley, and a controller that controls the operation of the CVT operation portion according to the corresponding signals of the accelerator position sensor, the vehicle speed sensor, the driving pulley rotation sensor and the driven pulley rotation sensor. The CVT acceleration control method may include determining, by the controller, whether a current vehicle driving state satisfies a predetermined starting control condition, monitoring, by the controller, a current driving pulley rotation speed change, determining, by the controller, whether the current vehicle driving state satisfies a predetermined trigger condition, setting, by the controller, a target driving pulley rotation speed change, and controlling, by the controller, the operation of the CVT operation portion such that the current driving pulley rotation speed change converges to the target driving pulley rotation speed change.

The predetermined starting control condition may be satisfied when the current CVT operation mode is in a linear section, the current vehicle speed is less than a predetermined reference vehicle speed, and a current pulley ratio is more than a starting control pulley ratio.

Whether the current CVT operation mode is in the linear section may be satisfied when the current driving pulley rotation speed is less than a predetermined linear control rotation speed.

The predetermined trigger condition may be satisfied when the current pulley ratio is less than a starting control pulley ratio.

The controlling of the convergence to the predetermined target driving pulley rotation speed change may be performed according to a difference between the current driving pulley rotation speed change and the target driving pulley rotation speed change.

The target driving pulley rotation speed change may be determined according to an output value of the accelerator position sensor, and an output value of the vehicle speed sensor.

The CVT acceleration control method may further include determining, by the controller, whether a current CVT operation mode is in a linear section after the controlling of the convergence to the predetermined target driving pulley rotation speed change, and if the current CVT operation mode is not in the linear section, the controller stops the CVT acceleration control.

Whether the current CVT operation mode is in the linear section may be satisfied when the current driving pulley rotation speed is less than a predetermined linear control rotation speed.

The CVT acceleration control method may further include determining, by the controller, whether the current driving pulley rotation speed change is less than the target driving pulley rotation speed change, and if the current driving pulley rotation speed change is less than the target driving pulley rotation speed change, the controller stops the CVT acceleration control.

According to the CVT acceleration control method according to various exemplary embodiments of the present invention, smooth acceleration may be provided in the starting region.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
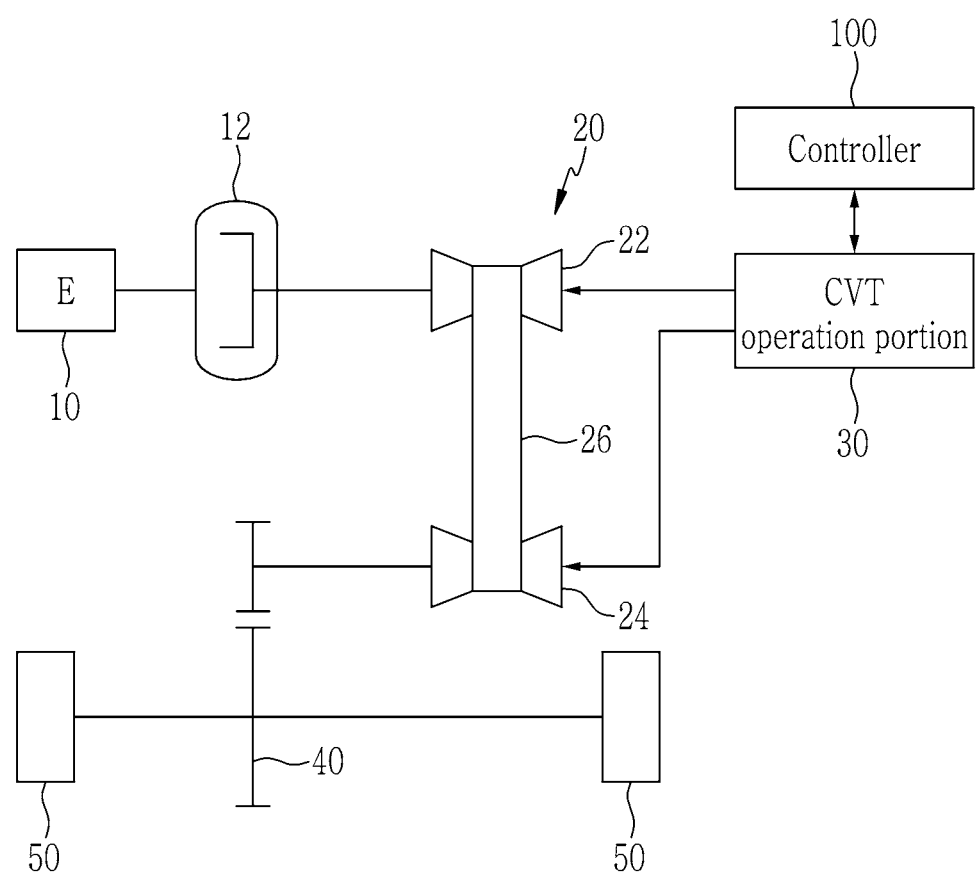
FIG. 1 is a schematic diagram of a CVT-mounted vehicle to which a CVT acceleration control method according to various exemplary embodiments of the present invention may be applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention Throughout the specification, parts marked with the same reference number mean the same constituent elements.

In the drawings, the thickness of layers, films, panels, regions, etc., are exaggerated for clarity.

Throughout the specification, unless explicitly described to the contrary, the word "comprise", and variations such as "comprises" or "comprising", will be understood to imply the inclusion of stated elements but not the exclusion of any other elements.

Various exemplary embodiments of the present invention will hereinafter be described in detail with reference to the accompanying drawings.

FIG. 1 is a schematic diagram of a CVT-mounted vehicle to which a CVT acceleration control method according to various exemplary embodiments of the present invention may be applied.

Referring to FIG. 1, a CVT-mounted vehicle to which the CVT acceleration control method according to various exemplary embodiments of the present invention may be applied includes engine 10, and the power of the engine 10 is transmitted to a CVT (continuously variable transmission; 20) through a torque converter 12 to change speed. After that, it is transferred to a driving wheel 50 through a differential 40.

The CVT 20 includes a driving pulley 22 that receives the power through the torque converter 12, a driven pulley 24 connected to the differential 40 and a belt 26 that connects the driving pulley 22 and the driven pulley 24.

And a CVT operation portion 30 operated by the control of the controller 100 controls pulley ratio of the driving pulley 22 and the driven pulley 24.

The controller 100 may be a hardware including at least one microprocessor (e.g., ECU (Engine Control Unit or Electronic Control Unit)) or the microprocessor operated by a predetermined program, and the predetermined program may include a series of commands for performing the CVT acceleration control method according to various exemplary embodiments of the present invention.

Figure 2:
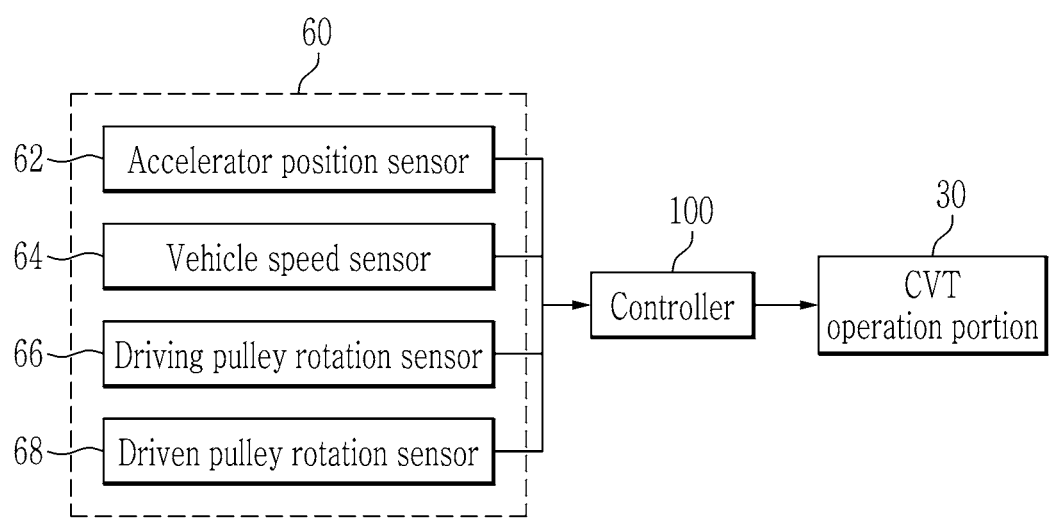
FIG. 2 is a block diagram of a CVT-mounted vehicle to which a CVT acceleration control method according to various exemplary embodiments of the present invention may be applied.

FIG. 2 is a block diagram of a CVT-mounted vehicle to which a CVT acceleration control method according to various exemplary embodiments of the present invention may be applied.

Referring to FIG. 2, a CVT-mounted vehicle to which the CVT acceleration control method according to various exemplary embodiments of the present invention can be applied includes a vehicle state detecting portion 60, and the controller 100 controls the CVT operation portion 30 according to the output signal of the vehicle state detecting portion 60.

The vehicle state detecting portion 60 may include an accelerator position sensor 62 that detects an accelerator operation angle and outputs corresponding signal, a vehicle speed sensor 64 that detects vehicle speed of a vehicle and outputs corresponding signal, a driving pulley rotation sensor 66 that detects rotation speed of a driving pulley and outputs corresponding signal, and a driven pulley rotation sensor 68 that detects rotation speed of a driven pulley and outputs corresponding signal.

The controller 100 may determine the pulley ratio of the driving pulley 22 and the driven pulley 24 according to the output signals of the driving pulley rotation sensor 66 and the driven pulley rotation sensor 68.

Figure 3:
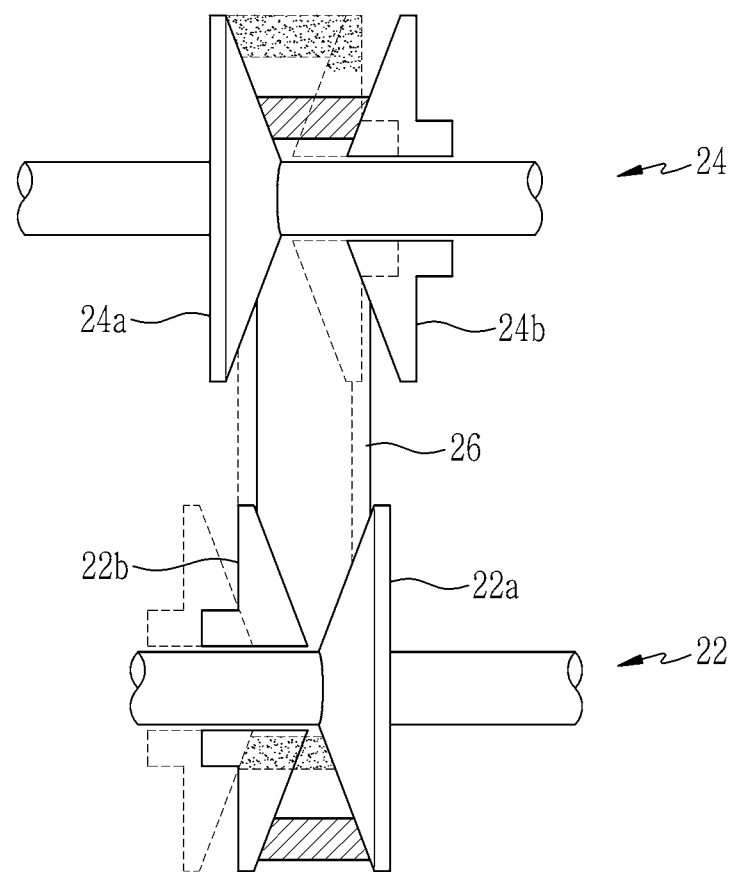
FIG. 3 is a drawing showing a CVT to which a CVT acceleration control method according to various exemplary embodiments of the present invention may be applied.

FIG. 3 is a drawing showing a CVT to which a CVT acceleration control method according to various exemplary embodiments of the present invention may be applied.

Referring to FIG. 3, the driving pulley 22 may include a driving fixed pulley 22a and a driving moving pulley 22b, and the driven pulley 24 may include a driven fixed pulley 24a and a driven moving pulley 24b.

Figure 4:
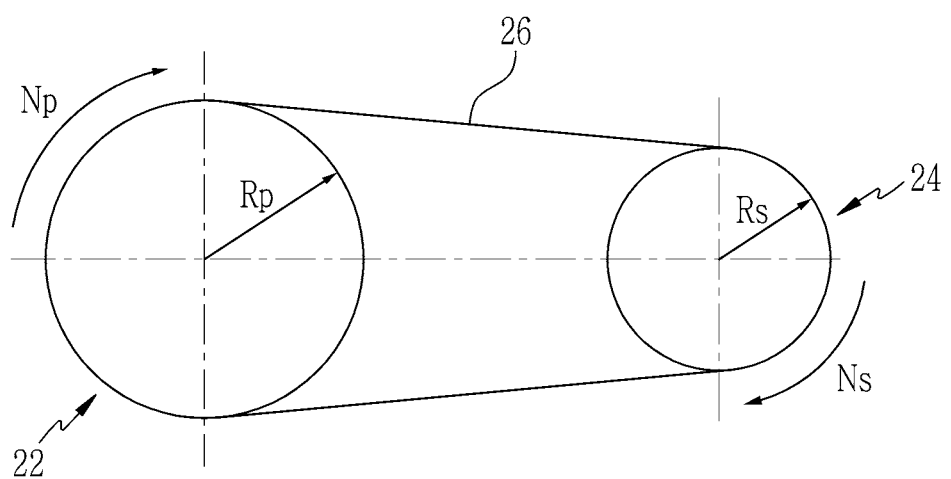
FIG. 4 is a drawing showing a pulley ratio of CVT to which a CVT acceleration control method according to various exemplary embodiments of the present invention may be applied.

FIG. 4 is a drawing showing a pulley ratio of CVT to which a CVT acceleration control method according to various exemplary embodiments of the present invention may be applied.

Referring to FIG. 3 and FIG. 4, the CVT operation portion 30 controls a pulley ratio of the driving pulley 22 and the driven pulley 24 by moving the driving moving pulley 22b and the driven moving pulley 24b.

For example, the CVT operation portion 30 supplies hydraulic pressure to the driving moving pulley 22b and the driven moving pulley 24b to change the relative position between the driving fixed pulley 22a and the driving moving pulley 22b, and the relative position between the driven fixed pulley 24a the driven moving pulley 24b.

Accordingly, an effective radius Rp of the driving pulley 22 and the effective radius Rs of the driven pulley 24 wound around by the belt 26 are changed, and the pulley ratio may be controlled. Here, the pulley ratio is the driving pulley rotation speed Np/driven pulley rotation speed Ns, and it may be determined as the effective radius Rs of the driven pulley 24/the effective radius Rp of the driving pulley 22.

The hydraulic pressure supply of the CVT operation portion 30 to change the effective radius Rp of the driving pulley 22 and the effective radius Rs of the driven pulley 24 are obvious to a person skilled in the art, and thus detailed description will be omitted.

Figure 5:
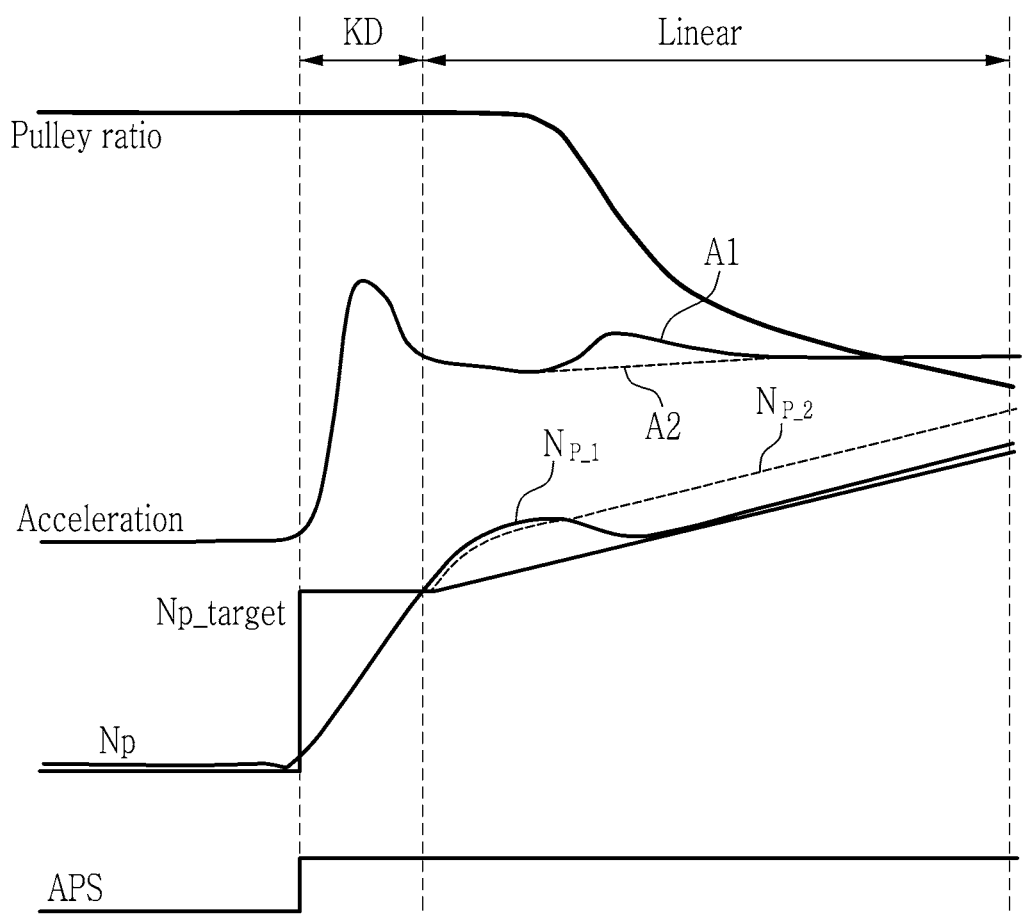
FIG. 5 is a graph illustrating an operation area to which a CVT acceleration control method according to various exemplary embodiments of the present invention is applied.

FIG. 5 is a graph illustrating an operation area to which a CVT acceleration control method according to various exemplary embodiments of the present invention is applied.

According to a general CVT acceleration control method, when an accelerator opening signal APS is generated by the driver's stepping on an accelerator pedal to start the vehicle (stop or accelerate at low speed), a target Np is determined according to the accelerator opening, and depending on the target Np (Np_target), a rotation speed of the driving pulley (currently Np_1) is controlled to follow the target Np. However, when transitioning from a KD section to a linear section, the target Np changes rapidly. As a result, the rotation speed Np_1 of the current driving pulley increases from the target Np and then follows the target Np again, resulting in acceleration change A1.

According to the CVT acceleration control method according to various exemplary embodiments of the present invention, the controller 100 monitors the current driving pulley rotation speed change, and sets the target driving pulley rotation speed change according to the monitored driving pulley rotation speed change, and then controls the current driving pulley rotation speed change to converge to the target driving pulley rotation speed change.

That is, according to the CVT acceleration control method according to various exemplary embodiments of the present invention, in the linear section, the current driving pulley rotation speed Np_2 has a relatively higher value than the general rotation speed Np_1 of the current driving pulley, and the speed change A2 becomes relatively small by following the target Np with a small change in speed. The graph in FIG. 5 shows only the trend of for better comprehension and acceleration change, and does not mean the actual value.

Figure 6:
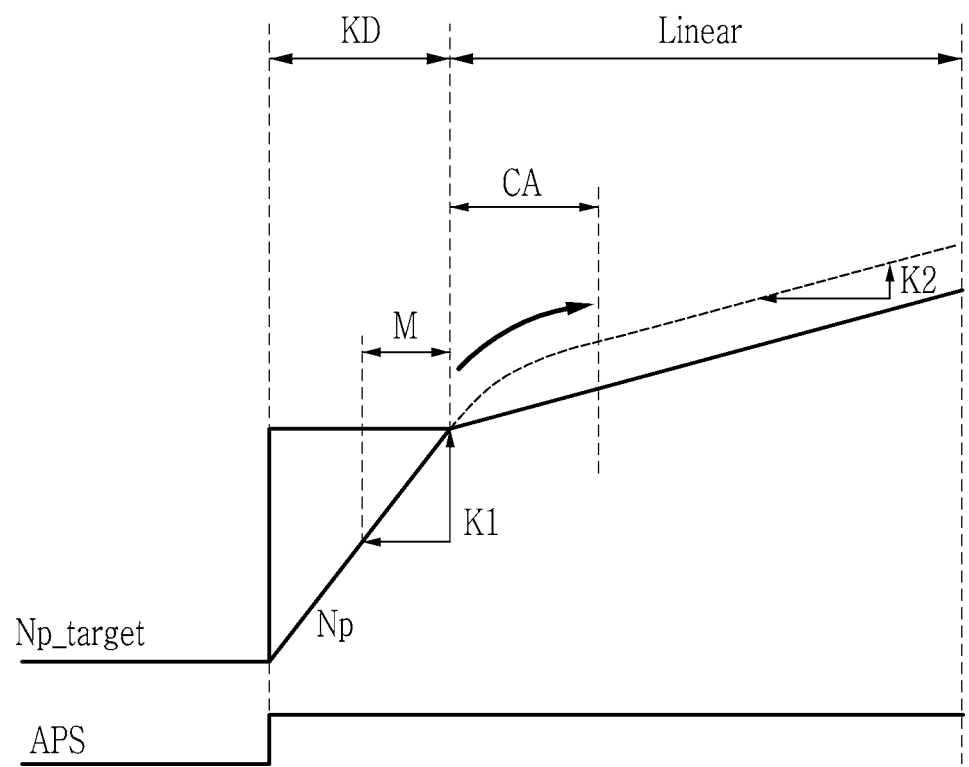
FIG. 6 is a graph illustrating an operation of a CVT acceleration control method according to various exemplary embodiments of the present invention.

FIG. 6 is a graph illustrating an operation of a CVT acceleration control method according to various exemplary embodiments of the present invention.

Referring to FIG. 6, according to the CVT acceleration control method according to various exemplary embodiments of the present invention, the current driving pulley rotation speed change, that is, the current driving pulley rotation speed slope K1, is measured in a certain section M of the kick-down KD area at the beginning of the control, and the controller 100 controls the rotation speed of the driving pulley by setting the target driving pulley rotation speed change, that is, the target driving pulley rotation speed slope K2, according to the output signal of the vehicle state detecting portion 60 and a predetermined map in advance. For example, the target driving pulley rotation speed slope K2 may be set by substituting the output signals of the accelerator position sensor 62 and the vehicle speed sensor 64 into a predetermined map in advance. The target driving pulley rotation speed (Np_target) is set so that the current driving pulley rotation speed slope K1 follows the target driving pulley rotation speed slope K2. Accordingly, smooth acceleration is possible by preventing a sudden change in driving pulley rotation speed in the CVT acceleration control section CA. In other words, the target driving pulley rotation speed (Np_target) is set to a gentle shape, and the actual driving pulley rotation speed (Np) may easily follow the target driving pulley rotation speed (Np_target), preventing rapid changes in speed, and smooth acceleration.

Figure 7:
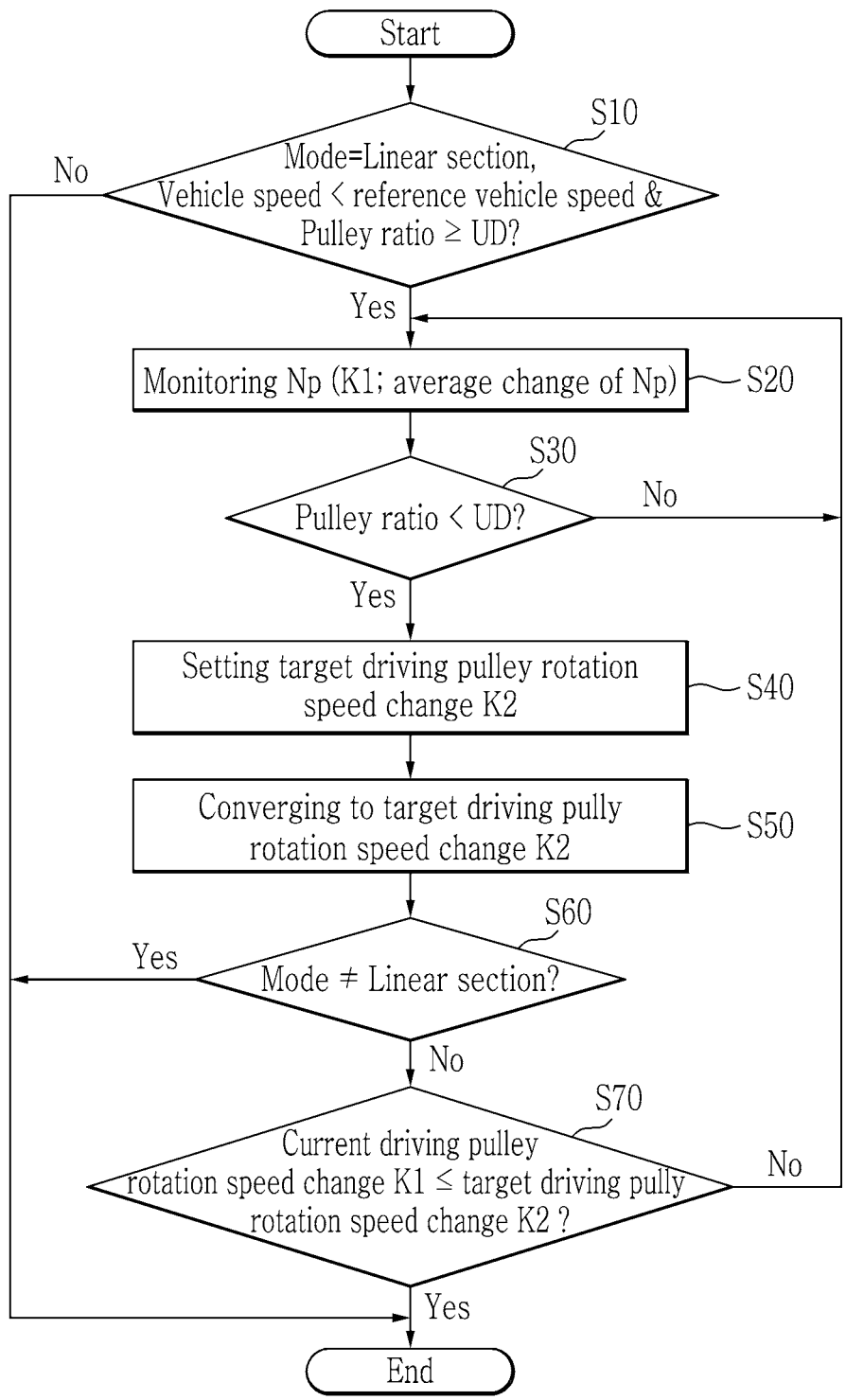
FIG. 7 is a flowchart showing a CVT acceleration control method according to various exemplary embodiments of the present invention.

FIG. 7 is a flowchart showing a CVT acceleration control method according to various exemplary embodiments of the present invention.

Referring to FIG. 7, the controller 100 determines whether the current vehicle driving state satisfies a predetermined starting control condition at S10, and when the starting control condition is satisfied, the controller 100 monitors the current driving pulley rotation speed change K1 at S20. In the instant case, the current driving pulley rotation speed change may be an average change in the number of rotations of the driving pulley.

The predetermined starting control condition is considered to be satisfied when a current CVT operation mode is in the linear section (referring to FIG. 5 and FIG. 6), a current vehicle speed is less than a predetermined reference vehicle speed, and a current pulley ratio is greater than or equal to a starting control pulley ratio UD.

Figure 8:
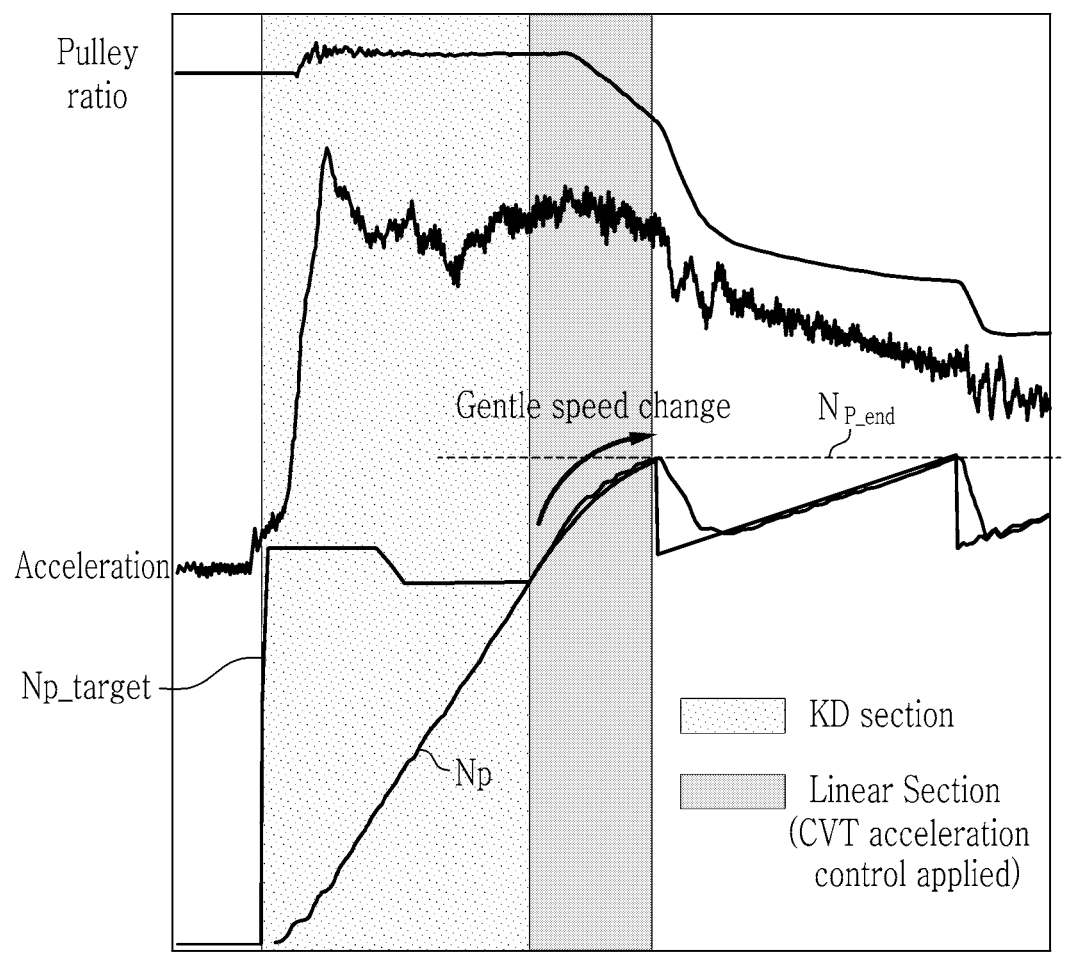
FIG. 8 is a graph showing changes in acceleration of a vehicle to which the CVT acceleration control method according to various exemplary embodiments of the present invention is applied.
Figure 9:
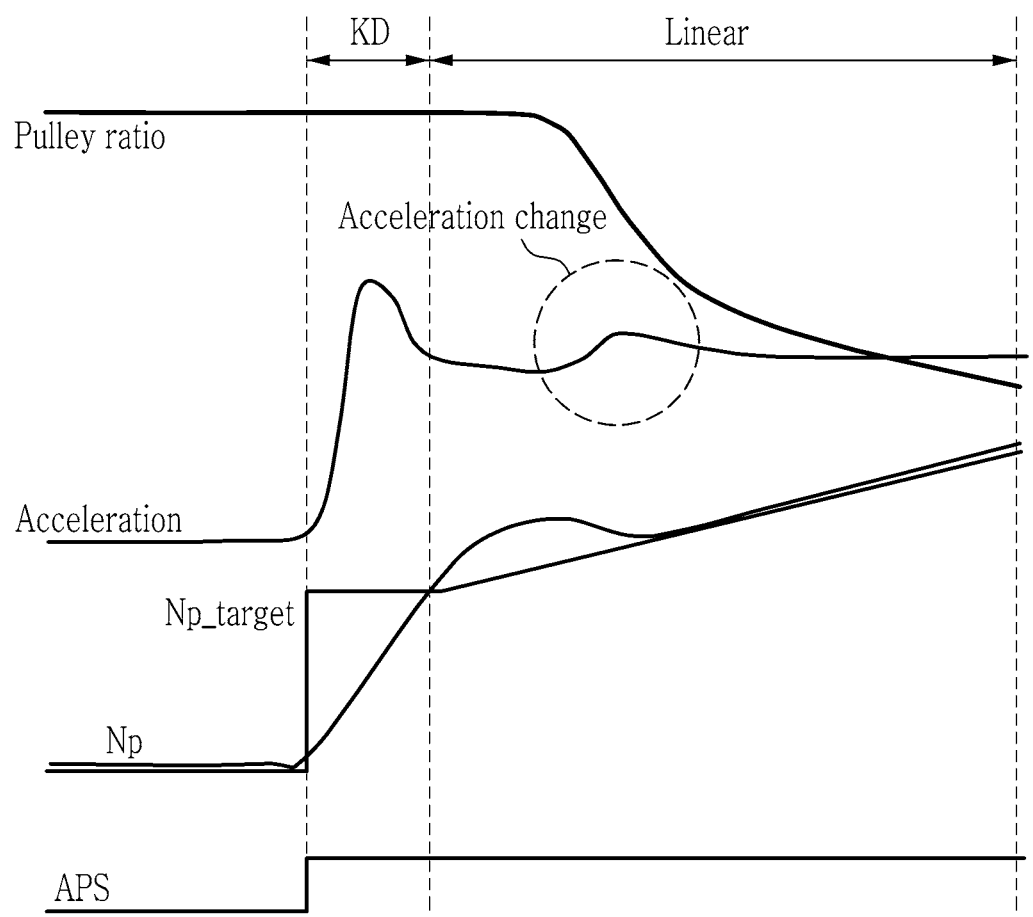
FIG. 9 is a graph showing AT simulation control of a general CVT-mounted vehicle.

Whether the current CVT operation mode is in the linear section may be satisfied when the current driving pulley rotation speed Np is less than or equal to a predetermined linear control rotation speed (Np_end; see FIG. 8). The linear control rotation speed (Np_end) means a driving pulley rotation speed at which the linear section ends. The end of the linear section may be preset in the AT simulation control. The CVT acceleration control method according to various exemplary embodiments of the present invention may be applied to prevent a sudden change in pulley ratio when transitioning from the KD section to the linear section during AT simulation control. It may be applied in low speed conditions, for example less than 50 kph. In addition, when the pulley ratio is relatively large, the driver may feel a relatively rapid change in speed, so it is applied to improve this. For example, the starting control pulley ratio UD may be set to be 95% or more. Here, the pulley ratio may be defined as 100% when the rotation ratio of the driving pulley 22 and the driven pulley 24 is the largest, and the smallest case as 0%.

The controller 100 determines whether the current vehicle driving condition satisfies a predetermined trigger condition at S30, and when the predetermined trigger condition is satisfied, the controller 100 sets the target driving pulley rotation speed change K2 at S40. Then the controller 100 controls the operation of the CVT operation portion 30 so that the current driving pulley rotation speed change K1 converges to the target driving pulley rotation speed change K2 at S50.

The predetermined trigger condition may be satisfied when the current pulley ratio is less than the starting control pulley ratio UD.

Referring to FIG. 5 and FIG. 6, the pulley ratio has a maximum value in the KD region and enters the linear region while the current driving pulley rotation speed Np increases, and then the pulley ratio decreases and thus a rapid change in acceleration may occur. In other words, immediately after entering the linear section, acceleration changes may occur along with a decrease in the pulley ratio.

However, according to the CVT acceleration control method according to various exemplary embodiments of the present invention, the target driving pulley rotation speed (Np_target) has a gentle shape because the target driving pulley rotation speed change K2 is set and followed. Therefore, the operation of the CVT operation portion 30 makes the actual driving pulley rotation speed (Np) to follow the target driving pulley rotation speed change K2 and prevents sudden changes in acceleration. For example, when the current pulley ratio is less than 95%, it may be set to satisfy the predetermined trigger condition.

The target driving pulley rotation speed change K2 may be determined according to the output value of the accelerator position sensor 62 and the output value of the vehicle speed sensor 64.

Referring to FIG. 6, the target driving pulley rotation speed change may be determined in advance by a predetermined map according to the output value of the accelerator position sensor 62, and the output value of the vehicle speed sensor 64 and the target driving pulley rotation speed change may be set to K2, as shown in the drawing.

The controller 100 determines the current pulley ratio through the output signals of the driving pulley rotation sensor 66 and the driven pulley rotation sensor 68, and controls the operation of the CVT operation portion 30 by setting a target pulley ratio according to the predetermined target driving pulley rotation speed (Np_target).

The controlling at S50, which converges on the target driving pulley rotation speed change K2, may be performed according to a difference between the driving pulley rotation speed change K1 and the target driving pulley rotation speed change K2.

For example, if the CVT acceleration control section (CA) is set to 1 sec, and the unit time of the CVT acceleration control section (CA) is 0.01 sec, the target driving pulley rotation speed (Np_target) according to the unit time may be determined by dividing the difference between the driving pulley rotation speed change K1 and the target driving pulley rotation speed change K2 by 100. The CVT acceleration control section (CA) and the unit time may be preset through an experiment.

The pulley ratio may be expressed as driving pulley rotation speed (Np)/driven pulley rotation speed (Ns), as described above, and may be expressed as the effective radius (Rs) of the driven pulley 24/the effective radius (Rp) of the driving pulley 22.

That is, the CVT operation portion 30 changes the effective radius (Rp) of the driving pulley 22 and the effective radius (Rs) of the driven pulley 24 according to a predetermined target pulley ratio.

The CVT acceleration control method according to various exemplary embodiments of the present invention further includes a step S60 of determining whether the current CVT operation mode is in the linear section by the controller 100 after the control to converge on the target driving pulley rotation speed change K2, and if the current CVT operation mode is not in the linear section, the controller 100 may stop the CVT acceleration control.

Whether the current CVT operation mode is in the linear section may be satisfied when the current driving pulley rotation speed (Np) is less than the predetermined linear control rotation speed (Np_end; see FIG. 8).

The CVT acceleration control method according to various exemplary embodiments of the present invention further includes a step S70 of determining, by the controller 100, whether the current driving pulley rotation speed change K1 is equal to or less than the target driving pulley rotation speed change K2 and if the current driving pulley rotation speed change K1 is less than the target driving pulley rotation speed change K2, the controller 100 may stop the CVT acceleration control.

Referring to FIG. 6 and FIG. 7, in the S20 step, the current driving pulley rotation speed slope K1 is measured, in the S40 step, the target driving pulley rotation speed change K2 is set, and in the S50 step, the operation of the CVT operation portion 30 is controlled the current driving pulley rotation speed change to converge on the target driving pulley rotation speed change K2. Thereafter, in the S70 step, if the current driving pulley rotation speed change K1 is not less than the target driving pulley rotation speed change K2, the current driving pulley rotation speed slope K1 is measured again in the S20 step, and in the S50 step, a new target driving pulley rotation speed slope K2 is set. After that, the operation of the CVT operation portion 30 is controlled to converge to the target driving pulley rotation speed change K2 in the S50 step.

FIG. 8 is a graph showing changes in acceleration of a vehicle to which the CVT acceleration control method according to various exemplary embodiments of the present invention is applied.

Figure 10:
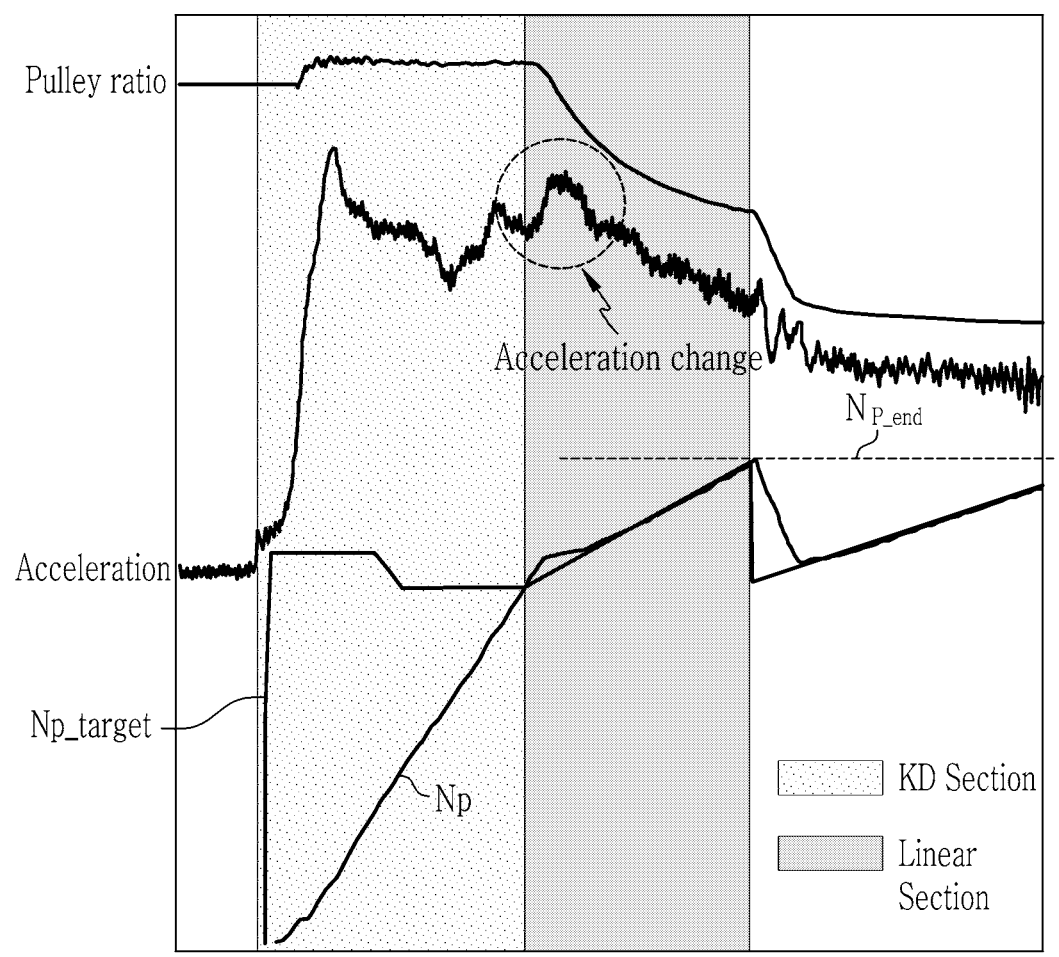
FIG. 10 is a graph showing the acceleration change of a general CVT-mounted vehicle.

Referring to FIG. 8 and FIG. 10, it may be seen that the acceleration change of the vehicle to which the CVT acceleration control method according to various exemplary embodiments of the present invention is applied is relatively small compared to the general CVT acceleration state.

After entering the linear section, the change in driving pulley rotation speed is relatively reduced, and the change in vehicle acceleration is relatively small, facilitating a smoother speed change. In other words, the change in the target driving pulley rotation speed becomes relatively gentle, so that the change in the relative pulley ratio is small, and thus the sudden change in acceleration is suppressed.

In addition, the approach speed may increase to the driving pulley rotation speed (Np_end) at which the linear section ends. In other words, while providing dynamic driving to the driver, it is possible to provide relatively smooth speed change.

In various exemplary embodiments of the present invention, each operation described above may be performed by a controller, and the controller may be configured by a plurality of controllers, or an integrated single controller.

In addition, the term "controller", "control unit" or "control device" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

In addition, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A continuously variable transmission (CVT) acceleration control method applied to a CVT-mounted vehicle including an accelerator position sensor that is configured to detect an accelerator operation angle and to output a corresponding signal, a vehicle speed sensor that is configured to detect a vehicle speed of the CVT-mounted vehicle and to output a corresponding signal, a driving pulley rotation sensor that is configured to detect a rotation speed of a driving pulley and to output a corresponding signal, a driven pulley rotation sensor that is configured to detect a rotation speed of a driven pulley and to output a corresponding signal, a CVT operation portion that is configured to control a pulley ratio of the driving pulley and the driven pulley, and a controller that is connected to the CVT operation portion and configured to control an operation of the CVT operation portion according to the corresponding signals of the accelerator position sensor, the vehicle speed sensor, the driving pulley rotation sensor and the driven pulley rotation sensor, the CVT acceleration control method comprising:

determining, by the controller, whether a current vehicle driving state satisfies a predetermined starting control condition;

monitoring, by the controller, a current driving pulley rotation speed change, upon concluding that the current vehicle driving state satisfies the predetermined starting control condition;

determining, by the controller, whether the current vehicle driving state satisfies a predetermined trigger condition;

setting, by the controller, a target driving pulley rotation speed change upon concluding that the current vehicle driving state satisfies the predetermined trigger condition; and controlling, by the controller, the operation of the CVT operation portion so that the current driving pulley rotation speed change converges to the target driving pulley rotation speed change.

2. The CVT acceleration control method of claim 1, wherein the predetermined starting control condition is satisfied if a current CVT operation mode is in a linear section, a current vehicle speed is less than a predetermined reference vehicle speed, and a current pulley ratio is more than a starting control pulley ratio.

3. The CVT acceleration control method of claim 2, wherein whether the current CVT operation mode is in the linear section is satisfied if a current driving pulley rotation speed is less than a predetermined linear control rotation speed.

4. The CVT acceleration control method of claim 1, wherein the predetermined trigger condition is satisfied if a current pulley ratio is less than a starting control pulley ratio.

5. The CVT acceleration control method of claim 1, wherein the controlling the operation of the CVT operation portion so that the current driving pulley rotation speed change converges to the target driving pulley rotation speed change, is performed according to a difference between the current driving pulley rotation speed change and the target driving pulley rotation speed change.

6. The CVT acceleration control method of claim 5, wherein the target driving pulley rotation speed change is determined according to the corresponding signal of the accelerator position sensor, and the corresponding signal of the vehicle speed sensor.

7. The CVT acceleration control method of claim 6, further including:
determining, by the controller, whether a current CVT operation mode is in a linear section after the controlling the operation of the CVT operation portion so that the current driving pulley rotation speed change converges to the target driving pulley rotation speed change,
wherein when the current CVT operation mode is not in the linear section, the controller is configured to stop a CVT acceleration control.

8. The CVT acceleration control method of claim 7, wherein whether the current CVT operation mode is in the linear section is satisfied if a current driving pulley rotation speed is less than a predetermined linear control rotation speed.

9. The CVT acceleration control method of claim 5, further including:
determining, by the controller, whether the current driving pulley rotation speed change is less than the target driving pulley rotation speed change,
wherein when the current driving pulley rotation speed change is less than the target driving pulley rotation speed change, the controller is configured to stop a CVT acceleration control.

10. The method of claim 1, wherein the controller includes:
a processor; and
a non-transitory storage medium on which a program for performing the method of claim 1 is recorded and executed by the processor.

11. A vehicle comprising:
a continuously variable transmission (CVT) including a driving pulley and a driven pulley engaged to the driving pulley;
an accelerator position sensor that is configured to detect an accelerator operation angle and to output a corresponding signal, a vehicle speed sensor that is configured to detect a vehicle speed of the vehicle and to output a corresponding signal, a driving pulley rotation sensor that is configured to detect a rotation speed of the driving pulley and to output a corresponding signal, and a driven pulley rotation sensor that is configured to detect a rotation speed of the driven pulley and to output a corresponding signal,
a CVT operation portion that is configured to control a pulley ratio of the driving pulley and the driven pulley of the CVT; and
a controller that is connected to the CVT operation portion and configured to control an operation of the CVT operation portion according to the corresponding signals of the accelerator position sensor, the vehicle speed sensor, the driving pulley rotation sensor and the driven pulley rotation sensor,
wherein the controller includes:
a processor; and
a non-transitory storage medium containing program instructions,
wherein the processor is configured of, by executing the program instructions:
determining whether a current vehicle driving state satisfies a predetermined starting control condition;
monitoring a current driving pulley rotation speed change, upon concluding that the current vehicle driving state satisfies the predetermined starting control condition;
determining whether the current vehicle driving state satisfies a predetermined trigger condition;
setting a target driving pulley rotation speed change upon concluding that the current vehicle driving state satisfies the predetermined trigger condition; and
controlling the operation of the CVT operation portion so that the current driving pulley rotation speed change converges to the target driving pulley rotation speed change.

12. The vehicle of claim 11, wherein the predetermined starting control condition is satisfied if a current CVT operation mode is in a linear section, a current vehicle speed is less than a predetermined reference vehicle speed, and a current pulley ratio is more than a starting control pulley ratio.

13. The vehicle of claim 12, wherein whether the current CVT operation mode is in the linear section is satisfied if a current driving pulley rotation speed is less than a predetermined linear control rotation speed.

14. The vehicle of claim 11, wherein the predetermined trigger condition is satisfied if a current pulley ratio is less than a starting control pulley ratio.

15. The vehicle of claim 11, wherein the controlling the operation of the CVT operation portion so that the current driving pulley rotation speed change converges to the target driving pulley rotation speed change is performed according to a difference between the current driving pulley rotation speed change and the target driving pulley rotation speed change.

16. The vehicle of claim 15, wherein the target driving pulley rotation speed change is determined according to the corresponding signal of the accelerator position sensor, and the corresponding signal of the vehicle speed sensor.

17. The vehicle of claim 16, further including:
determining whether a current CVT operation mode is in a linear section after the controlling the operation of the CVT operation portion so that the current driving pulley rotation speed change converges to the target driving pulley rotation speed change,
wherein when the current CVT operation mode is not in the linear section, the controller is configured to stop a CVT acceleration control.

18. The vehicle of claim 17, wherein whether the current CVT operation mode is in the linear section is satisfied if a current driving pulley rotation speed is less than a predetermined linear control rotation speed.

19. The vehicle of claim 15, further including:
determining whether the current driving pulley rotation speed change is less than the target driving pulley rotation speed change,
wherein when the current driving pulley rotation speed change is less than the target driving pulley rotation speed change, the controller is configured to stop a CVT acceleration control.

* * * * *